(12) United States Patent
Epshteyn et al.

(10) Patent No.: US 11,480,425 B2
(45) Date of Patent: Oct. 25, 2022

(54) METHOD, SYSTEM AND APPARATUS FOR MOBILE DIMENSIONING

(71) Applicant: ZEBRA TECHNOLOGIES CORPORATION, Lincolnshire, IL (US)

(72) Inventors: Alan J. Epshteyn, Mount Sinai, NY (US); Mohitosh Mondal, Brooklyn, NY (US); Raghavendra Tenkasi Shankar, Holbrook, NY (US); Patrick B. Tilley, Coram, NY (US)

(73) Assignee: Zebra Techologies Corporation, Lincolnshire, IL (US)

( * ) Notice: Subject to any disclaimer, the term of this patent is extended or adjusted under 35 U.S.C. 154(b) by 77 days.

(21) Appl. No.: 16/660,527

(22) Filed: Oct. 22, 2019

(65) Prior Publication Data

US 2021/0116232 A1 Apr. 22, 2021

(51) Int. Cl.
*G01B 11/02* (2006.01)
*G01B 11/26* (2006.01)
*G01B 11/00* (2006.01)
*G01B 11/24* (2006.01)

(52) U.S. Cl.
CPC .......... *G01B 11/022* (2013.01); *G01B 11/002* (2013.01); *G01B 11/24* (2013.01); *G01B 11/26* (2013.01)

(58) Field of Classification Search
CPC ....... G01B 11/002; G01B 11/24; G01B 11/26; G01B 11/022
See application file for complete search history.

(56) References Cited

U.S. PATENT DOCUMENTS

| 9,939,259 | B2* | 4/2018 | Showering | G01B 21/00 |
| 10,275,945 | B2* | 4/2019 | Lee | G06T 19/006 |
| 10,346,645 | B1* | 7/2019 | Nunnink | F21V 5/04 |
| 10,769,394 | B2* | 9/2020 | Drzymala | G02B 7/023 |
| 10,885,655 | B2* | 1/2021 | Gao | G06K 9/228 |
| 2011/0286007 | A1* | 11/2011 | Pangrazio | G01B 11/00 356/614 |
| 2013/0329013 | A1* | 12/2013 | Metois | H04N 13/204 348/46 |
| 2014/0100813 | A1* | 4/2014 | Showering | G01P 15/00 702/141 |
| 2014/0379613 | A1* | 12/2014 | Nishitani | G06Q 30/0283 705/400 |
| 2017/0358142 | A1* | 12/2017 | Lee | H04W 4/029 |
| 2019/0294840 | A1* | 9/2019 | Drzymala | G02B 27/62 |
| 2020/0065988 | A1* | 2/2020 | Gao | G06K 9/00664 |
| 2020/0265600 | A1* | 8/2020 | Oh | G06T 7/60 |
| 2020/0279389 | A1* | 9/2020 | McIver | G06T 7/12 |

OTHER PUBLICATIONS

"Faq—BoxSizeID" [accessed from http://boxsizeid.com/faq/on Jul. 22, 2019] (2017).

* cited by examiner

*Primary Examiner* — Boubacar Abdou Tchoussou

(57) ABSTRACT

A computing device includes: a tracking sensor including a camera; a controller connected with the tracking sensor, the controller configured to: control the tracking sensor to track successive poses of the computing device in a frame of reference; detecting a plurality of dimensioning events associated with an object; in response to detecting each of the dimensioning events, generate a respective position in the frame of reference based on a current one of the poses; generate, based on the positions, an object boundary in the frame of reference; and dimension the object based on the generated object boundary.

19 Claims, 11 Drawing Sheets

METHOD, SYSTEM AND APPARATUS FOR MOBILE DIMENSIONING

BACKGROUND

Determining the dimensions of objects may be necessary in a wide variety of applications. For example, it may be desirable to determine the dimensions of packages in a warehouse prior to shipping. Dimensioning objects, however, can require time-consuming and error-prone manual entry of tape-measured dimensions. Further, objects with irregular shapes introduce uncertainty in dimensioning procedure, and can lead to the use of dimensions that do not accurately reflect space consumed by the objects in a shipping container, vehicle or the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
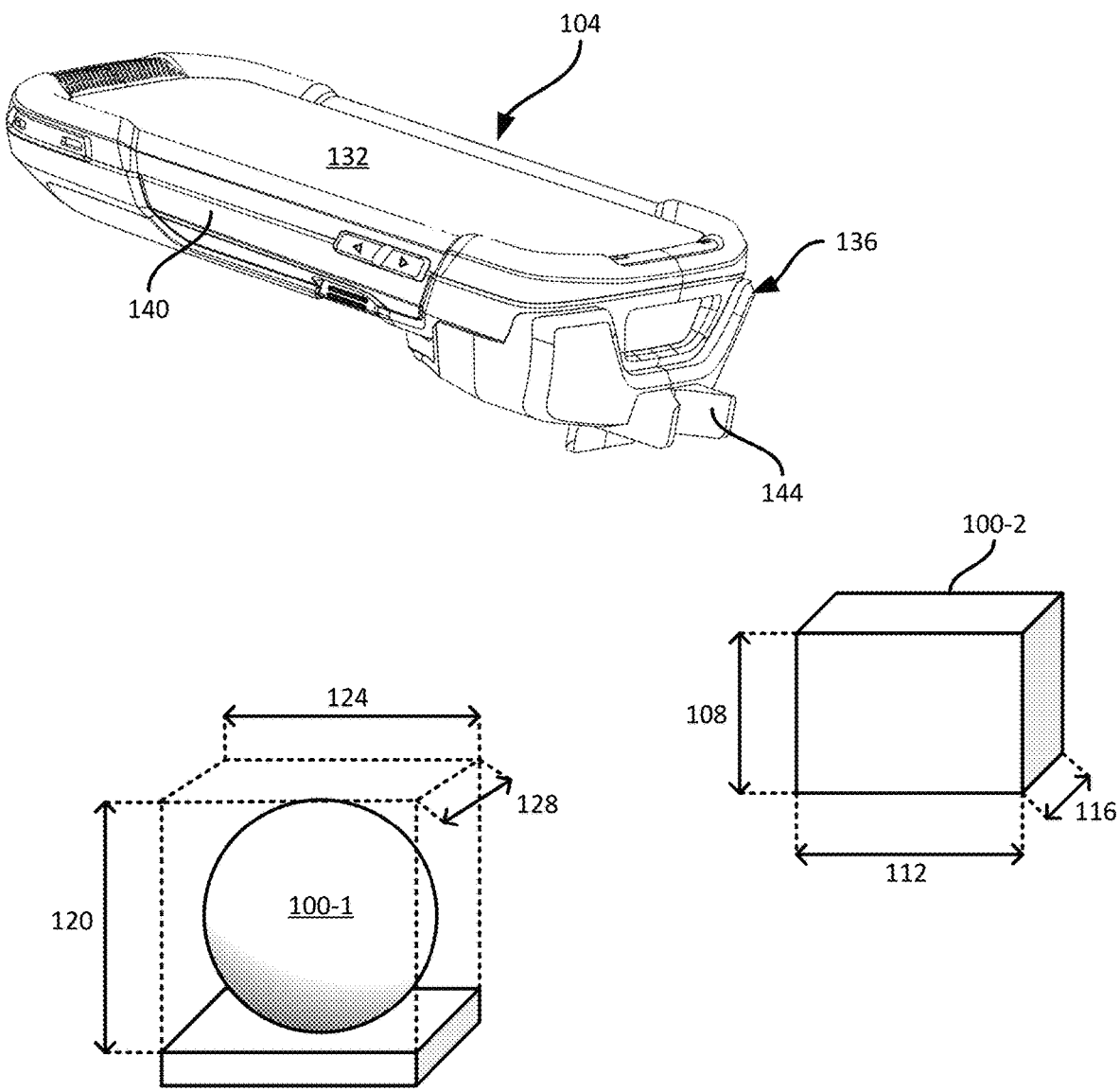
FIG. 1 is a diagram illustrating a mobile computing device for mobile dimensioning.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, comprising: a tracking sensor including a camera; a controller connected with the tracking sensor, the controller configured to: control the tracking sensor to track successive poses of the computing device in a frame of reference; detecting a plurality of dimensioning events associated with an object; in response to detecting each of the dimensioning events, generate a respective position in the frame of reference based on a current one of the poses; generate, based on the positions, an object boundary in the frame of reference; and dimension the object based on the generated object boundary.

Additional examples disclosed herein are directed to a method in a computing device, the method comprising: controlling a tracking sensor of the computing device to track successive poses of the computing device in a frame of reference; in response to detecting each of a plurality of dimensioning events associated with an object, generating a respective position in the frame of reference based on a current one of the poses; generating, based on the positions, an object boundary in the frame of reference; and dimensioning the object based on the generated object boundary.

Further examples disclosed herein are directed to a mobile computing device, comprising: a tracking sensor including a camera; an output assembly; an input assembly; a dimensioning accessory including a notch configured to engage with a corner of an object; a controller connected with the tracking sensor and the output assembly, the controller configured to: control the tracking sensor to track successive poses of the computing device in a frame of reference; in response to receiving each of a plurality of inputs via the input assembly, generate a respective position in the frame of reference based on a current one of the poses; generate, based on the positions, an object boundary in the frame of reference; and dimension the object based on the generated object boundary.

FIG. 1 depicts example objects 100-1 and 100-2, such as items (e.g. boxes or other packages) in a transport and logistics facility. The technology described herein can also be implemented in association with a wide variety of other objects in contexts other than transport and logistics. FIG. 1 also illustrates a mobile computing device 104 (also referred to herein as the mobile device 104 or simply the device 104) that is enabled to measure one or more dimensions of at least one of the objects 100. For example, the device 104 can determine a sufficient set of dimensions for each object 100 to enable the determination of a volume occupied by the objects 100.

As seen in FIG. 1, while the object 100-2 is a box having a volume defined by a height 108, a width 112 and a length or depth 116, the object 100-1 is a spherical object, supported on a platform (e.g. a pallet). A wide variety of objects 100 may have irregular (e.g. non-rectangular) shapes. Examples of such objects 100 include machinery components such as engine blocks, collections of regular-shaped components (e.g. boxes) that have been wrapped or otherwise packaged together on a pallet or other support to form an irregularly-shaped stack, and the like. The storage and shipping of such objects 100 may require, despite the irregular shape of the objects 100, knowledge of the dimensions of a box-shaped bounding volume enclosing the objects 100. For example, it may be desirable to discover virtual height, width and depth 120, 124 and 128 of the object 100-1, as shown in FIG. 1.

In the examples discussed below, the device 104 is enabled not only to determine object dimensions (whether real, as in the dimensions 108, 112, 116 or virtual, as in the dimensions 120, 124 and 128), but also to present information, e.g. to an operator of the device 104, permitting visual verification of the dimensions determined by the device 104. The device 104 performs the above functions by tracking its own pose (i.e. position and orientation) during the dimensioning process, and generating and storing positions in three-dimensional space that correspond to certain features of the objects 100. From the stored positions, the device 104 generates object boundaries which can be presented via an output assembly of the device 104, such as a display 132.

As will be discussed below in greater detail, the device 104 can generate the above-mentioned positions corresponding to object features via a contact mechanism or a non-contact mechanism. In the contact-based mechanism, the device 104 is manipulated by an operator to place a predetermined point on the exterior of the device 104 against a set of predetermined points on the object 100. For example, the above-mentioned point on the device 104 can be placed against each of a plurality of corners (e.g. at least three) of the object 100-2, or against virtual corners of the boundary for the object 100-1. The device 104 determines the positions of the corners, from which object dimensions and boundaries can be generated.

The device 104 can include, for use in the contact-based mechanism, a dimensioning accessory 136 either integrally formed with a housing 140 of the device 104, or removably secured to the housing 140 as will be illustrated in subsequent drawings. The dimensioning accessory 136 can include a notch 144 that accepts corners of a box-shaped object. Thus, placing the notch 144 against a corner places the device 104 at a repeatable position relative to the corner, and enables the device 104 to determine the position of the corner.

In the non-contact-based mechanism, the device 104 is manipulated by an operator to pass over an object 100 in a direction substantially parallel to the width or the depth of the object 100. The device 104 detects a height measurement between the device 104 itself and a reference surface located below the device. As the device 104 travels over the object 100, the reference surface transitions from a support surface upon which the object 100 rests (e.g. a table, a conveyor belt, a scale or the like), to the top of the object 100, and back to the support surface. As noted above in connection with the contact-based mechanism, the device 104 tracks its position in three dimensions throughout the passage over the object 100. The device 104 detects the above-mentioned transitions of the reference surface, which correspond to edges of the object 100, and stores positions in three dimensions corresponding to the edges. By detecting the edges in each of a width-wise pass and a length-wise pass over the object 100, the device 104 can determine the extents of a bounding box encompassing the object 100.

Before further discussing the functionality implemented by the device 104 to dimension objects 100, certain components of the device 104 will be described, with reference to FIGS. 2 and 3.

Figure 2:
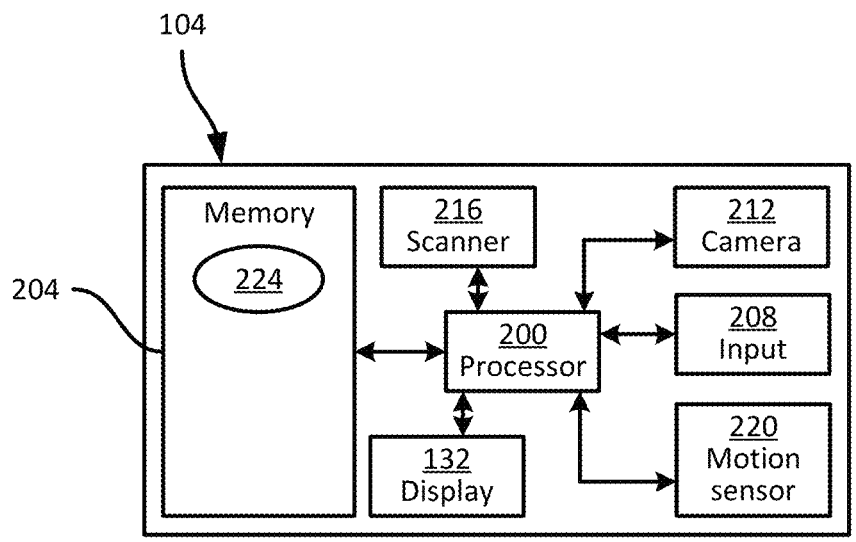
FIG. 2 is a block diagram of certain internal hardware components of the mobile computing device of FIG. 1.

Referring to FIG. 2, a block diagram of certain components of the device 104 is illustrated. The device 104 includes a special-purpose controller, such as a processor 200, interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The device 104 also includes at least one input assembly 208 interconnected with the processor 200. The input assembly 208 is configured to receive input (e.g. from an operator of the device 104) and provide data representative of the received input to the processor 200. The input assembly 208 includes any one of, or a suitable combination of, a touch screen integrated with the display 132, a keypad, a trigger button, a microphone, and the like. In addition, the device 104 includes a camera 212 including a suitable image sensor or combination of image sensors. The camera 212 is configured to capture a sequence of images (e.g. a video stream) for provision to the processor 200 and subsequent processing to track the pose of the device 104.

The device 104 can also include a scanning assembly 216 (also simply referred to as a scanner 216), such as a barcode scanner. The scanner 216 can be an image-based scanner, and thus include further image sensors in addition to those mentioned above in connection with the camera 212. In other examples, the scanner 216 is a laser-based scanner. In further examples, the scanner 216 can be omitted.

In addition to the display 132, the device 104 can also include one or more other output assemblies, such as a speaker, a notification LED, and the like (not shown). Further, the device 104 includes a motion sensor 220, such as an inertial measurement unit (IMU) including one or more accelerometers, one or more gyroscopes, and/or one or more magnetometers. The motion sensor 220 is configured to generate data indicating detected movement of the device 104 and provide the data to the processor 200, for processing along with the images from the camera 212 to track the current pose of the device 104. Therefore, the camera 212 and the motion sensor 220 may also be referred to as a tracking sensor. As will be apparent to those skilled in the art, other combinations of image sensors and/or motion sensors can be employed to implement a tracking sensor. For example, a tracking sensor can be implemented with one or more of an ultra-wideband sensor, a lidar sensor, an ultrasonic sensor, or the like.

The memory 204 stores computer readable instructions for execution by the processor 200. In particular, the memory 204 stores a dimensioning application 224 (also referred to simply as the application 224) which, when executed by the processor 200, configures the processor 200 to perform various functions discussed below in greater detail and related to the tracking of the pose of the device 104 and the generation of three-dimensional positions for use in dimensioning objects 100. The application 224 may also be implemented as a suite of distinct applications in other examples.

The processor 200, when so configured by the execution of the application 224, may also be referred to as a dimensioning controller 200. Those skilled in the art will appreciate that the functionality implemented by the processor 200 via the execution of the application 224 may also be implemented by one or more specially designed hardware and firmware components, such as FPGAs, ASICs and the like in other embodiments.

Figure 3:
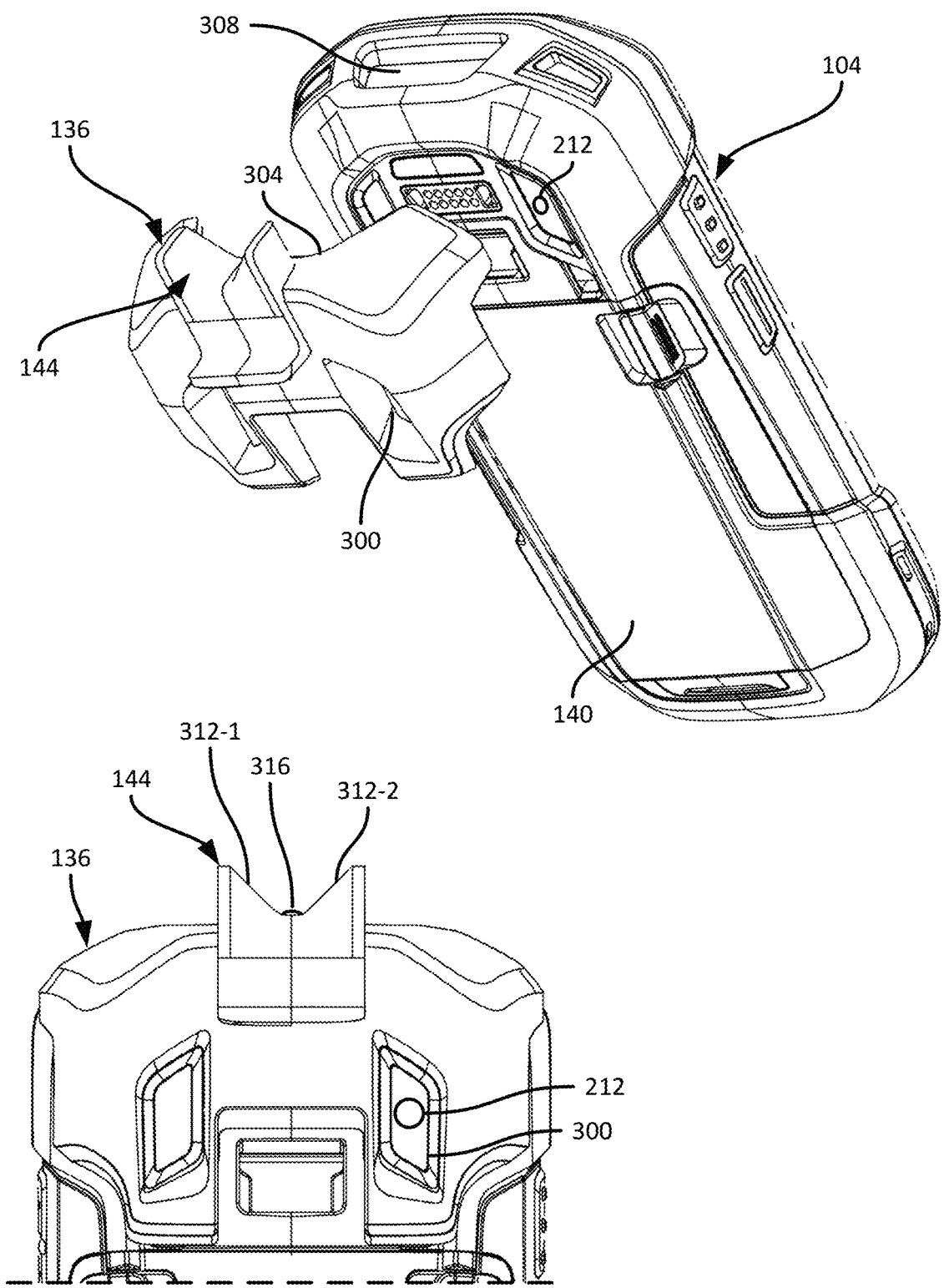
FIG. 3 is an exploded view of the mobile computing device of FIG. 1, seen from the back.

Turning to FIG. 3, an exploded view of the device 104 is shown from the back, illustrating certain additional features of the device 104. In particular, the position of the camera 212 in the present example is illustrated, on a rear (i.e. facing away from the display 132) surface of the device housing 140. In other examples, additional cameras may be placed on other locations of the device housing 140. The dimensioning accessory 136 is shaped and dimensioned to cooperate with a rear portion of the device housing 140, to removably couple the dimensioning accessory 136 to the device housing 140 in a predefined position (i.e. such that the position of the notch 144 relative to the device housing 140 is substantially identical whenever the dimensioning accessory 136 is coupled to the device housing 140). The dimensioning accessory 136 includes an opening 300 therethrough that is disposed around the camera 212 when the dimensioning accessory 136 is coupled with the device housing 140, permitting continued use of the camera 212. The dimensioning accessory 136 also includes a cutout 304 to accommodate a sensor window 308 of the scanner 216 when the dimensioning accessory 136 is coupled with the device housing 140. In other examples, e.g. in which the scanner 216 is omitted, the cutout 304 can also be omitted from the dimensioning accessory 136.

As shown in the partial rear view of FIG. 3, the notch 144 includes inclined surfaces 312-1 and 312-2 that define the notch. The accessory 136 can also include an input 316, such as a button, where the inclined surfaces 312 meet (that is, in the center of the notch). When the notch 144 is pressed against an object, the input 316 is activated to trigger the capture of a measurement by the device 104, as will be described below in greater detail.

Figure 4:
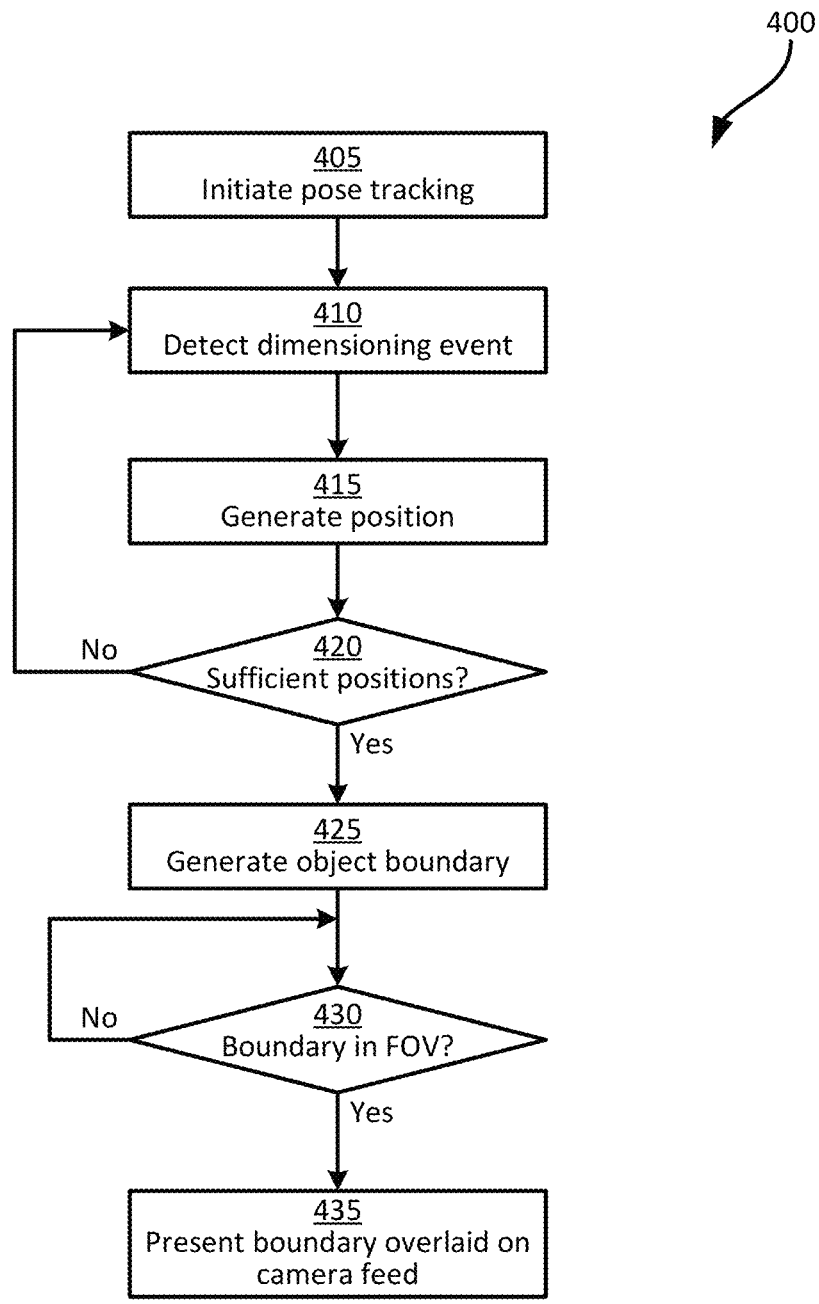
FIG. 4 is a flowchart of a method of dimensioning objects.

Turning now to FIG. 4, the functionality implemented by the device 104 will be discussed in greater detail. FIG. 4 illustrates a dimensioning method 400, which will be discussed below in conjunction with its performance by the device 104.

At block 405, the device 104 initiates pose tracking. That is, the device 104 begins tracking successive poses (i.e. positions and orientations of the device 104 in three dimensions), at any suitable frequency (e.g. at a frequency of about 30 or 60 Hz, although a wide variety of other pose estimation frequencies can also be employed). The frequency with which pose estimates are generated by the device 104 may depend, for example, on the frame rate of the camera 212 and/or the sampling frequency of the motion sensor 220. Pose tracking can be initiated responsive to receiving an input command, e.g. from the operator of the device 104, via the input assembly 208.

To track the pose of the device 104, the processor 200 controls the tracking sensor to capture data representing the surroundings of the device 104, as well as motion of the device 104. In the present example, the processor 200 controls the camera 212 to begin capturing a stream of images and providing the images to the processor 200. The processor 200 also controls the motion sensor 220 to provide motion data (e.g. defining accelerations affecting the device 104, as well as changes in orientation of the device 104). The processor 200 detects one or more image features in the images from the camera 212, and tracks the changes in position of such features between images. Examples of features include corners, edges (e.g. changes in gradient) and the like detectable via any suitable feature-detection algorithms. The movement of such features between images is indicative of movement of the device 104.

The positions of the above-mentioned image features, as well as motion data from the motion sensor 220, can be provided as inputs to a pose estimator implemented by the processor 200, such as a Kalman filter. Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc.

Figure 5:
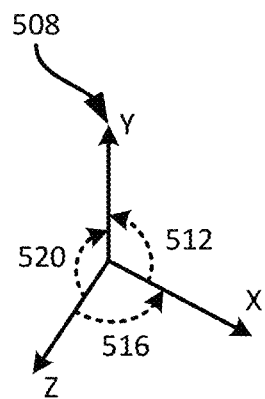
FIG. 5 is a diagram illustrating a performance of block 405 of the method of FIG. 4.
Figure 5:
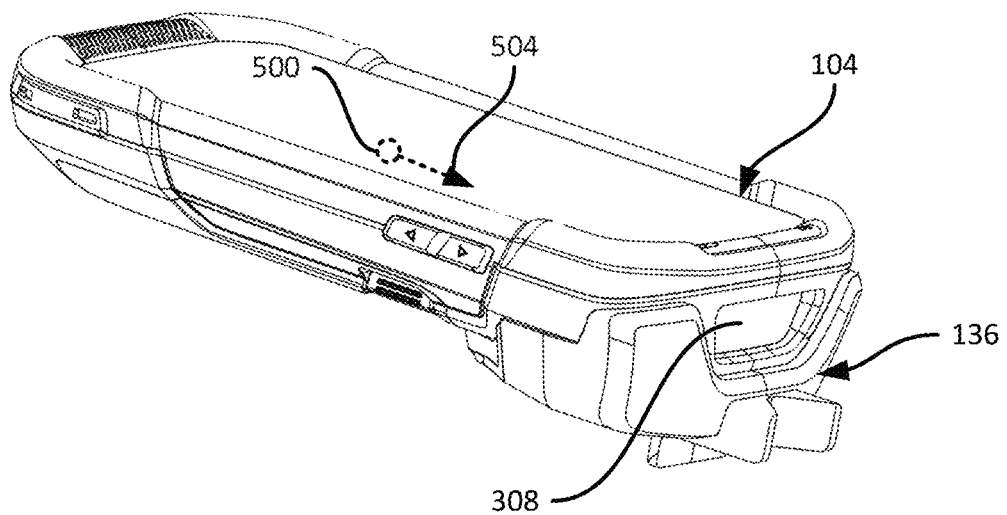

Turning to FIG. 5, an example pose estimate is illustrated as determined at block 405, including a location 500 and an orientation 504. The location 500 represents the location of a reference point on the device 104, such as a centroid of the device 104. In other embodiments, the location 500 can correspond to a different point of the device 104 (e.g. a center of a lens assembly of the camera 212). The orientation 504 represents the direction in which the front of the device 104 (e.g. the forward surface, bearing the sensor window 308) is currently facing. The location 500 and orientation 504 are defined relative to a three-dimensional frame of reference 508. In particular, the location 500 is defined by positions along each of the three axes of the frame of reference 508, and the orientation 504 is defined by angles in each of three planes (an angle 512 in the XY plane, an angle 516 the XZ plane, and an angle 520 in the ZY plane). The origin of the frame of reference 508 is defined arbitrarily by the device 104 when the performance of block 405 begins. For example, the origin of the frame of reference 508 may be set as the current location of the centroid of the device 104, upon initiation of block 405. Thus, the first tracked pose upon initiation of pose tracking may have a location of [0, 0, 0], indicating that the device 104 is at the origin of the frame of reference 508.

Returning to FIG. 4, once pose tracking is initiated at block 405, pose tracking is performed continuously throughout the remainder of the method 400. At block 410, while pose tracking continues, the device 104 detects a dimensioning event. The nature of the dimensioning event varies based on which mode the device 104 is operating in (that is, which of the contact-based and non-contact-based dimensioning mechanisms the device 104 implements). Example implementations of the detection of dimensioning events will be discussed further below. In brief, when the device 104 employs the contact-based dimensioning mechanism, a dimensioning event 410 is an indication that the device 104 is positioned at a corner (whether real or virtual). When the device 104 employs the non-contact-based dimensioning mechanism, a dimensioning event 410 is a detection of a change (e.g. beyond a predetermined threshold) in height between the device 104 and a reference surface, indicating an edge of the object 100.

In response to the detection of a dimensioning event at block 410, at block 415 the device 104 generates a position in three dimensions (e.g. in the frame of reference 508 shown in FIG. 5) corresponding to the detected dimensioning event. The position, in other words, corresponds to a point on an object 100, such as a corner or an edge. The device 104 then, at block 420, determines whether sufficient positions have been generated via the performance of blocks 410 and 415 to generate a complete object boundary. If additional positions are required, the performance of blocks 410 and 415 are repeated. The device 104 can be configured to present prompts to the operator on the display 132 or via other output assemblies. Otherwise, the performance of the method 400 proceeds to block 425.

Figure 6:
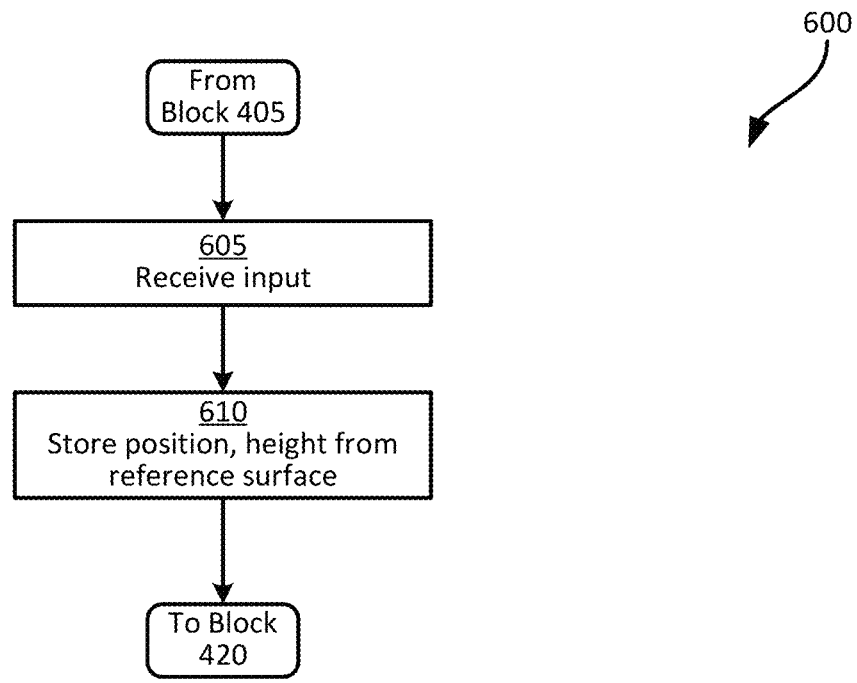
FIG. 6 is a flowchart of a method of performing blocks 410 and 415 of the method of FIG. 4.
Figure 7:
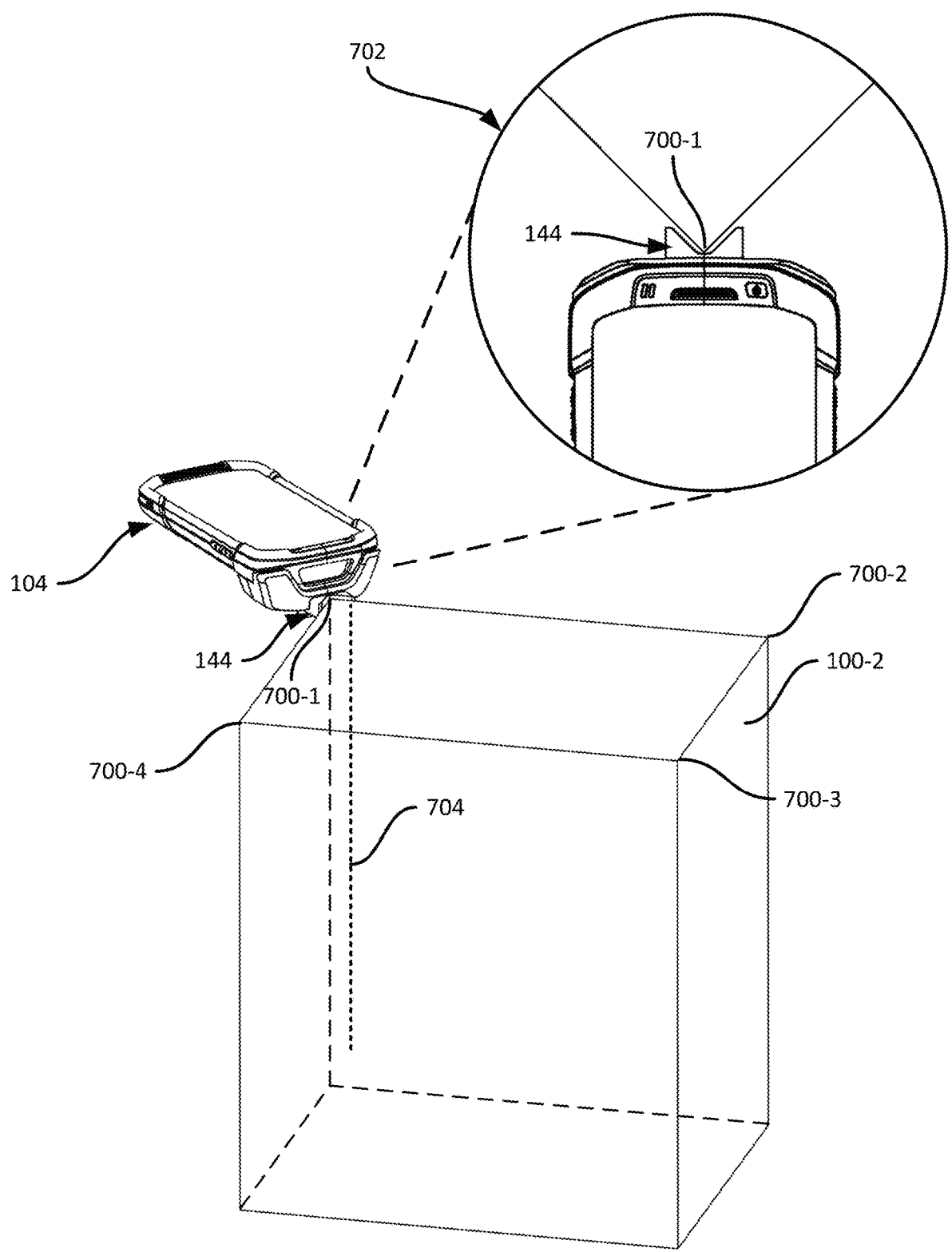
FIG. 7 is a diagram illustrating a performance of the method of FIG. 6.

Turning to FIG. 6, a method 600 for performing blocks 410 and 415 employing the above-mentioned contact-based dimensioning mechanism is illustrated. In particular, at block 605 the device 104 receives an input indicating a dimensioning event. The input can be received at the input assembly 208, for example in the form of a button or trigger-press, a selection on a touch screen, or the like. The input indicates that the device 104 is positioned against a predetermined feature of an object 100, such as a corner. Turning to FIG. 7, the device 104 is shown with the notch 144 positioned against one of the upper corners 700-1, 700-2, 700-3 and 700-4 of the object 100-2. The overhead view 702 illustrates engagement of the corner 700-1 with the notch 144. As will now be apparent, the notch 144 constrains the position and orientation of the device 104 relative to the object 100-2 when the notch 144 is engaged with the corner 700-2. At block 605, the device 104 receives an input, e.g.

from the operator of the device 104, when the device 104 is positioned as shown in FIG. 7. In other examples, as illustrated in FIG. 3, the notch 144 can include the input 316 (e.g. a button) therein, such that placing the notch against the object 100-2 causes depression of the input and transmission of an input to the processor 200.

At block 610, in response to receiving the input, the device 104 stores a position according to the frame of reference 508. The position stored at block 610 identifies the location of the corner 700-1 in the frame of reference 508. The tracked poses, however, may not indicate the position of the notch 144, but rather may indicate the pose of the centroid of the device 104, as shown in FIG. 5. The processor 200 can therefore retrieve (e.g. from the memory 204) calibration parameters defining a transform between the device centroid (or other suitable reference point whose pose is tracked), and apply the calibration parameters to the pose to generate the corner position.

The processor 200 can also, at block 610, store a height associated with the corner 700-1. The height is a height 704 between the corner 700-1 and a reference surface upon which the object 100-2 rests. The height is measured via images captured by the camera 212, as the orientation of the device 104 points the camera 212 towards the reference surface (e.g. a table or other support surface upon which the object 100-2 rests). To determine the height, the processor 200 selects a region (e.g. a pixel or group of pixels) in an image from the camera 212 that is projected vertically from the camera 212, and determines the distance from the camera lens to the selected region. Based on the above-mentioned calibration parameters, the distance between the corner 700-1 itself and the reference surface is determined. As will be apparent, the above assumes that the reference surface is a substantially horizontal surface. In other examples, the height can be measured via other mechanisms, such as a rangefinder mounted to the device 104 and aimed in the same direction as the camera 212 (downwards, in the orientation illustrated in FIG. 7).

Returning briefly to FIG. 4, when the device 104 implements the contact-based mechanism, the determination at block 420 serves to assess whether a set of positions have been generated from which the device 104 can generate an object boundary. If the device 104 stores height measurements along with positions at block 610, measurements for three of the upper corners 700 are sufficient. If height measurements are not stored, four corners, e.g. three of the upper corners 700 and at least one lower corner, are sufficient at block 420. Alternatively, three lower corners and one of the upper corners 700 are also sufficient. Thus, when the determination at block 420 is negative, the processor 200 can control the display 132 and/or another output assembly to prompt the operator to capture a position for another corner (the prompt may also identify specific corners to capture).

Figure 8:
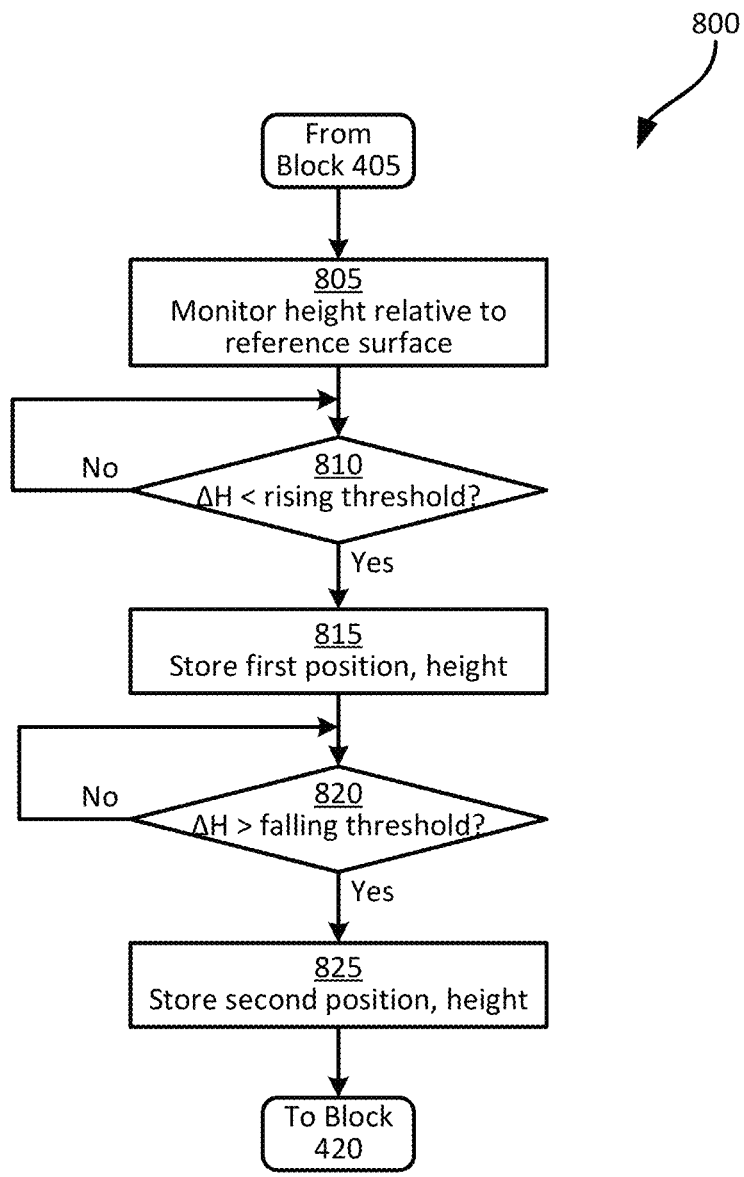
FIG. 8 is a flowchart of another method of performing blocks 410 and 415 of the method of FIG. 4.

Turning to FIG. 8, a method 800 of performing blocks 410-415 of the method 400 when implementing the non-contact-based dimensioning mechanism is illustrated. At block 805, the device 104 monitors a height from the device 104 itself to a reference surface, as discussed above in connection with FIG. 7. That is, the device 104 selects a region of images captured by the camera 212 that are projected vertically from the camera 212, and determines the position of the selected regions in the frame of reference 508. Based on the pose of the device 104 and the above-mentioned positions of the selected image regions, height measurements can be determined. Tracking of height continues throughout the performance of the method 800. The device 104 also determines differences between each pair of successive height measurements.

Figure 9:
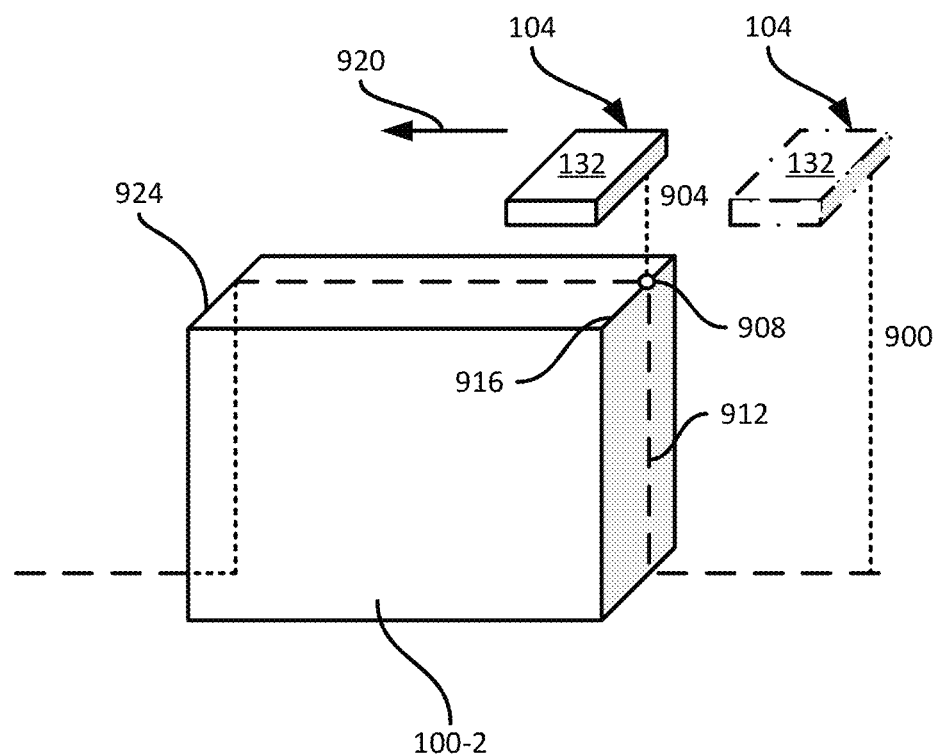
FIG. 9 is a diagram illustrating a performance of the method of FIG. 8.

At block 810, the device 104 determines whether the difference mentioned above is smaller than a rising threshold. When the determination at block 810 is affirmative, the increase in height indicates the presence of the target object 100. In other words, the affirmative determination at block 810 indicates that the reference surface has transitioned from a support surface on which the object 100 rests to the object 100 itself. Turning to FIG. 9, a first height measurement 900 is illustrated as generated from a first position of the device 104. The measurement 900 is the vertical distance between the device 104 and a reference surface such as the floor, a conveyor belt, a scale or the like. FIG. 9 also illustrates a second height measurement 904 generated from a second position of the device 104.

As seen in FIG. 9, the height 904 is smaller than the height 900. In other words, the change in height from the height 900 to the height 904 is a negative change, and in the present example it is assumed that the negative change is smaller than a rising threshold. For example, the rising threshold may be a negative change of 3 cm, while the change illustrated in FIG. 9 is a negative change of 25 cm.

Returning to FIG. 8, when the determination at block 810 is negative, height tracking continues. When the determination at block 810 is affirmative, however, the device 104 proceeds to block 815, and stores a position and height associated with the determination at block 810. Specifically, a position of an edge of the object 100 is determined from the second height compared at block 810 and the pose of the device 104. Thus, referring to FIG. 9, a position 908 and a height 912 are stored at block 815, which define a position of an upper edge 916 of the object 100-2. The height 912, as will be apparent from FIG. 9, is the difference between the first height measurement 900 and the height 904.

At block 820, as the device 104 continues to traverse the object 100 (e.g. in the direction 920 shown in FIG. 9), the device 104 continues to monitor the height between the device 104 and the reference surface, and determines whether the difference between successive height measurements exceeds a falling threshold. As will be apparent from FIG. 9, at the edge 924 of the object 100-2 (opposite the edge 916), the reference surface will transition back from the object 100-2 to the support surface, and the height measured by the device will therefore increase. When the determination at block 820 is negative, the device 104 repeats the performance of block 820 for the next pair of height measurements.

When the determination at block 820 is affirmative, the device 104 stores a second position and height at block 825, as described above in connection with block 815. The second position and height stored at block 825 define the position of an edge (e.g. the edge 924) opposing the edge defined by the position and height stored at block 815.

Returning to FIG. 4, as noted above, the determination at block 420 serves to assess whether a set of positions have been generated from which the device 104 can generate an object boundary. When the device 104 implements the non-contact-based mechanism, the determination at block 420 can be a determination of whether positions of two pairs of opposing edges have been collected. That is, the device 104 determines at block 420 whether two substantially perpendicular passes over the object (e.g. the width-wise traverse shown in FIG. 9 and a depth-wise traverse) have been completed, to define the positions of four edges. When the determination at block 420 is negative, the performance of the method 800 is repeated (e.g. in response to a prompt presented on the display 132).

Figure 10:
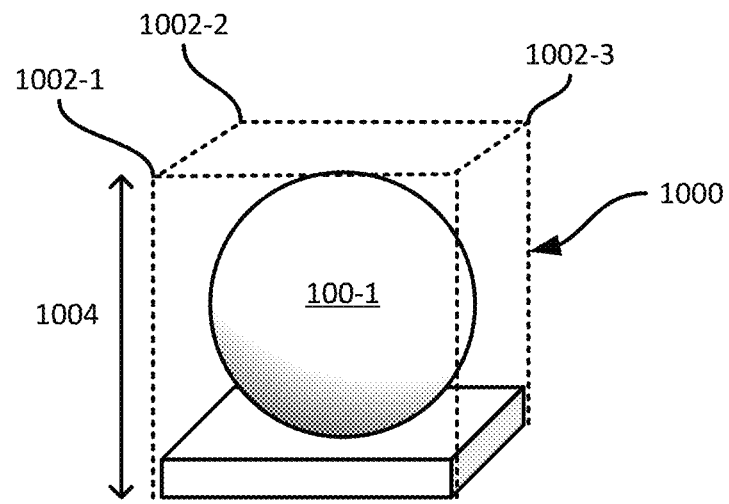
FIG. 10 is a diagram illustrating object boundaries generated at block 425 of the method of FIG. 4.
Figure 10:
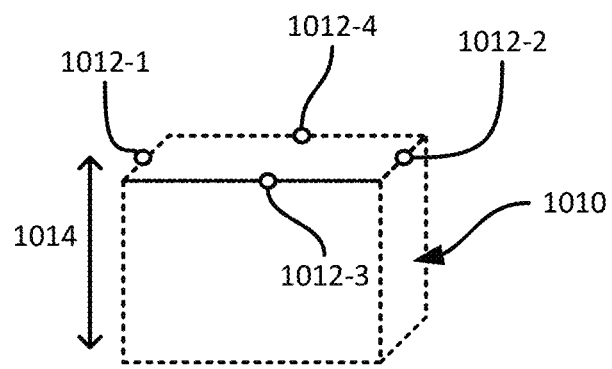

When the determination at block 420 is affirmative, the device 104 proceeds to block 425, at which the device 104 generates an object boundary based on the positions generated at block 415. The object boundary is generated based on either the corner positions captured via the method 600, or the edge positions captured via the method 800. Turning to FIG. 10, a first object boundary 1000 is shown, with an upper face generated based on corner positions 1002-1, 1002-2 and 1002-3. A second object boundary 1010 is also illustrated, with an upper face generated based on edge positions 1012-1, 1012-2, 1012-3 and 1012-4. The heights of the object boundaries 1000 and 1010 are generated by selecting the maximum height captured during the performance of the methods 600 or 800, respectively.

Returning again to FIG. 4, at block 430 the device 104 continues to track its pose, and determines whether the object boundary generated at block 425 is within the field of view of the camera 212. The position and orientation of the camera field of view are tracked by virtue of the pose tracking initiated at block 405, and the device 104 is therefore enabled to determine, at block 430, whether the camera field of view intersects with any portion of the object boundary generated at block 425 in the frame of reference 508. When the determination at block 430 is negative, the device 104 continues to monitor its pose.

Figure 11:
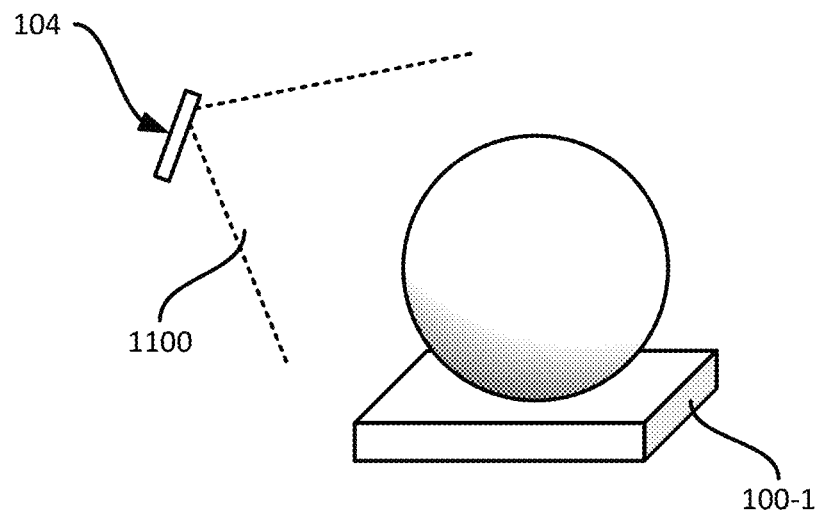
FIG. 11 is a diagram illustrating a performance of blocks 430 and 435 of the method of FIG. 4.
Figure 11:
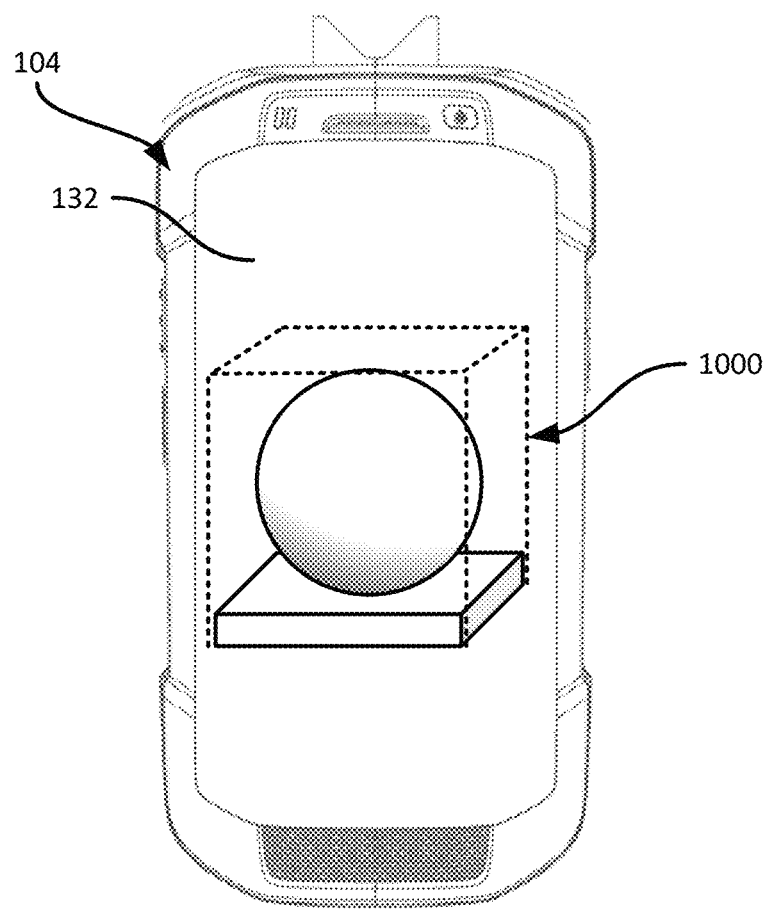

When the determination at block 430 is affirmative, however, the device 104 proceeds to block 435. At block 435, the device 104 presents a camera feed (i.e. a series of images captured by the camera, substantially in real time) on the display 132, along with an overlay of the object boundary from block 425. Turning to FIG. 11, the device 104 is shown having been repositioned such that a field of view 1100 of the camera 212 encompasses the object 100-1. The pose of the device 104 (and therefore of the camera field of view 1100) is tracked according to the frame of reference 508, and the position of the object boundary 1000 is known within the frame of reference 508, and the device 104 can therefore determine whether the object boundary 1000 falls within the field of view 1100.

FIG. 11 also illustrates the display 132, controlled to present the camera feed (showing the object 100-1) along with an overlay of the object boundary 1000. From the data presented on the display 132 at block 435, an operator can therefore assess whether the object boundary 1000 has been generated with sufficient accuracy. In some examples, the device 104 can generate a quality metric associated with the bounding box. For example, the pose tracking initiated at block 405 can include the generation, for each pose of the device 104, of a confidence level. The confidence level may, for example, be based on a density of points (i.e. features employed for navigation) detected via the camera 212. At block 425, for example, the device 104 can determine whether the confidence levels associated with any vertex of the object boundary fail to exceed a predetermined threshold. When the determination is affirmative, indicating that at least some of the measurements employed to generate the object boundary are associated with low confidence values, the device 104 can present a warning message to the operator and/or discard the object boundary and return to block 405.

The method 400 can be terminated (e.g. if the object boundary 1000 is accurately placed), or the operator can control the device 104 to return to block 405 (e.g. if the object boundary 1000 is not accurately placed). At block 435, or subsequent to block 435, the device 104 can also generate a label bearing the dimensions of the object boundary, transmit the dimensions to another computing device, or the like.

Variations to the above systems and methods are contemplated. For example, the device 104 can store (e.g. in the memory 204) one or more tare heights, e.g. indicating the heights of support structures that are smaller than the objects supported thereon. For example, packages in a facility may be dimensioned via the mechanisms above while being weighed on a scale. The scale, however, may be small enough that it does not protrude out from underneath the objects 100. Thus, the above methods may report inflated object heights. By storing as a tare height the height of the scale itself, the device 104 can be configured, e.g. at block 415, to subtract the tare height from each height stored with a generated position. The above-mentioned tare heights can be determined via performance of the method 400 in connection with the scale (or other object) itself. That is, the device 104 can be employed to generate an object boundary for the scale, and can save the object boundary for subsequent selection as a tare option when dimensioning another object resting on the scale.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a tracking sensor;
a controller connected with the tracking sensor, the controller configured to:
control the tracking sensor to track successive poses of the computing device in a frame of reference;
detect a plurality of dimensioning events associated with an object;
in response to detecting each of the dimensioning events, generate a respective position in the frame of reference based on a current one of the poses;
generate, based on the positions, an object boundary in the frame of reference; and
dimension the object based on the generated object boundary,
wherein the controller is further configured, in order to detect a dimensioning event, to:
at each of the poses, determine a height between the computing device and a reference surface,
determine, for each successive pair of poses, whether a change in height between the pair is smaller than a rising threshold, and
responsive to determining that the change in height is smaller than the rising threshold, monitor for a second dimensioning event by determining, for each successive pair of poses, whether a change in height between the pair is greater than a falling threshold.

2. The computing device of claim 1, wherein the respective position corresponds to at least one of an edge and a corner of an object.

3. The computing device of claim 1, wherein the respective position corresponds to a virtual corner bounding an object.

4. The computing device of claim 1, further comprising an input assembly, wherein the dimensioning event includes an input received at the controller via the input assembly.

5. The computing device of claim 1, wherein the controller is further configured to:
store a height of each of the positions; and
in order to generate the object boundary, generate a bounding box having an upper face defined by at least three of the positions, and having a height defined by at least one of the heights stored with the positions.

6. The computing device of claim 5, wherein the controller is further configured, to generate the object boundary, to:
subtract a predetermined tare height from the at least one of the heights stored with the positions to determine the height of the bounding box.

7. The computing device of claim 1, further comprising a dimensioning accessory removably coupled to a housing of the computing device, the dimensioning accessory including a notch configured to engage with a corner of an object.

8. The computing device of claim 7, wherein the dimensioning accessory includes an input within the notch, the input being configured to activate when the notch engages with the corner; and wherein one of the dimensioning events is detected when the input is activated.

9. The computing device of claim 1, further comprising an output assembly and a camera; wherein the controller is further configured to:
determine, based on the tracked poses of the computing device, that the object boundary intersects with a field of view of the camera; and
in response to the determination, control the output assembly to present the object boundary overlaid on a camera feed.

10. A method in a computing device, the method comprising:
controlling a tracking sensor of the computing device to track successive poses of the computing device in a frame of reference;
in response to detecting each of a plurality of dimensioning events associated with an object, generating a respective position in the frame of reference based on a current one of the poses;
generating, based on the positions, an object boundary in the frame of reference; and
dimensioning the object based on the generated object boundary,
wherein detecting a dimensioning event includes:
at each of the poses, determining a height between the computing device and a reference surface, determining, for each successive pair of poses, whether a change in height between the pair is smaller than a rising threshold, and responsive to determining that the change in height is smaller than the rising threshold, monitoring for a second dimensioning event by determining, for each successive pair of poses, whether a change in height between the pair is greater than a falling threshold.

11. The method of claim 10, wherein the respective positions correspond to at least one of edges and corners of an object.

12. The method of claim 10, wherein the respective positions correspond to virtual corners bounding an object.

13. The method of claim 10, wherein the dimensioning event includes an input received at a controller of the mobile computing device via an input assembly.

14. The method of claim 10, further comprising:
storing a height of each of the positions; and
generating the object boundary by generating a bounding box having an upper face defined by at least three of the positions, and having a height defined by at least one of the heights stored with the positions.

15. The method of claim 10, further comprising:
detecting, based on the tracked poses of the computing device, that the object boundary intersects with a field of view of a camera of the computing device; and
in response to the detection, controlling an output assembly of the computing device to present the object boundary overlaid on a camera feed.

16. A mobile computing device, comprising:
a tracking sensor;
an input assembly;
a dimensioning accessory including a notch at a forward surface of the dimensioning accessory, the notch configured to engage with a corner of an object, wherein the input assembly includes a button disposed within the notch and configured to be activated when the notch engages the corner of the object;
a controller connected with the tracking sensor, the controller configured to:
control the tracking sensor to track successive poses of the computing device in a frame of reference;
in response to receiving each of a plurality of inputs via the input assembly, generate a respective position in the frame of reference based on a current one of the poses;
generate, based on the positions, an object boundary in the frame of reference; and
dimension the object based on the generated object boundary.

17. The mobile computing device of claim 16, further comprising a device housing;
wherein the dimensioning accessory is removably coupled to the device housing.

18. The mobile computing device of claim 16, wherein the input assembly further includes at least one of a trigger, a second button, and a selectable element presented via an output assembly.

19. The mobile computing device of claim 16, further comprising a camera and an output assembly, wherein the controller is further configured to:
detect, based on the tracked poses of the computing device, that the object boundary intersects with a field of view of the camera; and
in response to the detection, control the output assembly to present the object boundary overlaid on a camera feed.

* * * * *